Jan. 13, 1953

G. N. KROUSE 2,625,585

MAGNETIC MEASURING GAUGE

Filed Dec. 1, 1949

INVENTOR.
Glen N. Krouse
BY
W. S. McDowell
ATTORNEY

Patented Jan. 13, 1953

2,625,585

UNITED STATES PATENT OFFICE 2,625,585

MAGNETIC MEASURING GAUGE

Glen N. Krouse, Columbus, Ohio

Application December 1, 1949, Serial No. 130,560

8 Claims. (Cl. 175—183)

The present invention relates generally to gages or measuring instrumentalities, and more specifically, to an improved magnetic gage device for determining by magnetic principles the thickness of non-magnetic plating or coating disposed upon a magnetic metallic surface; the thickness of magnetic coatings upon non-magnetic surfaces; the thickness of magnetic sheet materials, and the relative spacing between layers or sheets of magnetic materials.

In the past, various types of measuring instrumentalities have been proposed for use in determining the thickness of magnetic metallic sheets and non-magnetic platings and coatings disposed upon magnetic bodies, but generally, previously known instrumentalities of this type usually comprised relatively delicate electromagnetic or electronic apparatus which was limited in its use to bench operations or to test patterns of relatively small size, due to the inability of such instruments to accommodate workpieces or bodies of relatively large size and thickness. In most instances, apparatus heretofore employed in measuring or determining the thickness of non-magnetic coatings or platings generally embodied spaced upper and lower limbs or arms between which a body to be measured was positioned. In such instances, previously known apparatus of this character was limited in that the same was incapable of measuring relatively large or thick objects toward their central regions. These same limitations were inherent in the usual micrometer caliper of the type embodying a C-frame into which the body to be measured was inserted along one edge to determine the thickness thereof.

It is, therefore, an object of the present invention to provide a relatively small, compact, portable magnetic gage operable in conjunction with a precalibrated reference bar to accurately determine the thickness of non-magnetic plating or coating disposed upon the surface of a magnetic metallic body, regardless of the size or shape of the body upon which the plating or coating is carried.

Another object of this invention is to provide a relatively small, compact and portable pencil-like gage which, in operation, may be simply placed against a surface to be measured and thereafter adjusted to obtain a reading of the forces required to separate a relatively small permanent magnet from the surface being gaged, at which point the gage may be transferred to a precalibrated reference bar to interpret the reading of the gage in terms of the actual thickness of the non-magnetic coating or plating disposed upon the measured surface.

Yet another object of this invention is to provide a gage of the aforementioned character which comprises but few and relatively simple parts which, when assembled in operative order, provide a small and compact pencil-like instrument which is characterized by an extreme accuracy, while possessing ruggedness heretofore unthought-of with reference to measuring instrumentalities.

Still another object of this invention is to provide a gage by which the thickness of non-magnetic platings or coatings may be determined, and which comprises a relatively small hollow casing member in which is movably carried a permanent magnet adapted to project through one end of the casing for magnetic engagement with a surface to be gaged, and which is provided with an adjustable spring system operable to exert forces upon the magnet to separate the same from magnetic engagement with a body being gaged, with means being provided for indicating the force required to overcome the magnetic attraction of the enclosed magnet with the body being gaged, and thereby to determine from an associated precalibrated measuring bar the magnetic qualities of the workpiece and the thickness of the non-magnetic coating or plating disposed thereon.

For a further and more detailed understanding of the present invention, and the various additional objects and advantages realized therefrom, reference is made to the following description and the accompanying drawings, wherein.

Figure 3:
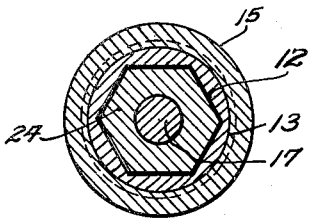
Fig. 3 is a horizontal sectional view taken along the line 3—3 of Fig. 2.

With reference to the drawings, it will be seen that my present improved magnetic gage makes use of a hollow, substantially cylindrical casing or barrel 10 which is formed with an internal cylindrical bore or chamber 11 extending approximately through the lower half of the casing, and an upper chamber 12 having a hexagonal cross-sectional configuration, as shown particularly in Fig. 3 of the drawings. On its outer surface, the barrel 10 is provided with a screw-threaded region 13 extending for approximately one-half the length of the casing. The hexagonal chamber 12 of the barrel terminates at its upper end in a straight opening, whereas the lower cylindrical chamber 11 terminates at its lowermost end in a relatively small or restricted opening 14, the lower end of the barrel 10 being rounded upon its outer surface to provide a tapered point.

Rotatively carried upon the outer surface of the barrel 10 is a tubular sleeve 15 which is formed internally with a screw-threaded region for cooperative threaded engagement with the externally screw-threaded region of the barrel 10. Thus, the tubular sleeve 15 is arranged to move longitudinally upon the barrel 10 upon relative rotation of the sleeve and barrel. At its upper end, the sleeve 15 is formed with an annular inwardly directed shoulder 16 which defines a circular opening within the upper end wall of the sleeve.

Extending longitudinally and axially of the barrel 10 is an elongated rod device 17 which terminates at its lower end in a relatively enlarged socket head 18. A distance above the socket head 18, the rod is formed with a cylindrical screw-threaded region 19 for the reception of the lower end portion of an expansion spring 20. Intermediate its ends, the rod member 17 possesses a relatively reduced diameter, and the junction between the relatively reduced portion of the rod and the larger cylindrical portion thereof provides an annular shoulder 21 disposed intermediate the length of the rod. As shown particularly in Figures 1 and 2, the rod 17 is of a length to extend a distance outwardly through the upper end of the barrel and the sleeve member 16.

Rigidly positioned within the socket head 18 of the rod, as by press fitting, is a cylindrical permanent magnet 22 which terminates in a lower tapered and pointed end extremity 23 which, in one position of the rod, extends within the small opening 14 formed in the tapered end of the barrel 10. Preferably, the magnet 22 is of the permanently magnetic type and may advantageously comprise an aluminum-nickel-cobalt-iron alloy of the type known to possess high and permanent magnetic strength.

Slidably carried within the hexagonal chamber 12 of the barrel is a bushing member 24 of generally hexagonal cross-sectional configuration, and which is formed at either end with upper and lower cylindrical screw-threaded projections 25 and 26 respectively. The bushing 24 is further provided with a cylindrical axial bore throughout its length which possesses a diameter slightly greater than the outer diameter of the reduced portion of the rod 17 which extends axially through the bore of the bushing. The lower screw-threaded region 26 of the bushing threadedly receives the upper turns of the spring 20, whereas the upper screw-threaded region 25 of the bushing extends through the opening provided by the inwardly turned flange 16 of the sleeve member, and receives a pair of cooperatively threaded lock nuts 27.

Figure 2:
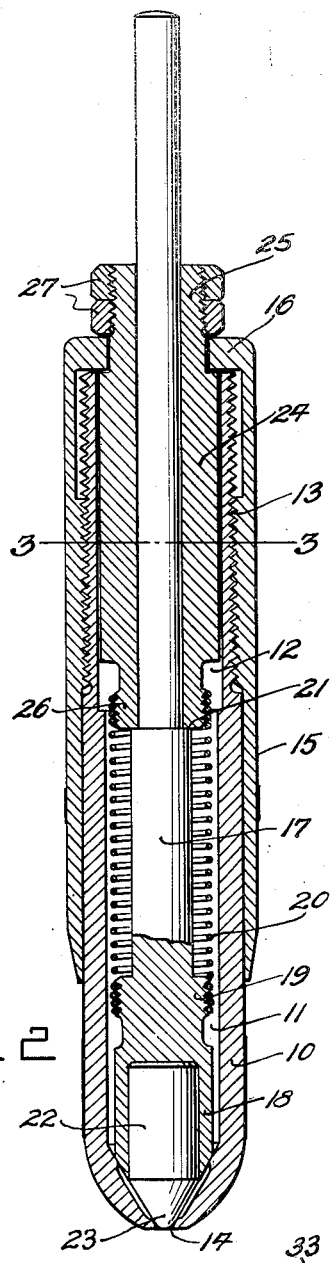
Fig. 2 is a medial longitudinal sectional view taken through the present gage.

By reference to Figure 2 of the drawings, it will be seen that the bushing 24 is movable longitudinally within the hexagonal chamber 12 of the barrel in conjunction with the longitudinal movement of the sleeve 15 upon the outer surface of the barrel. At the same time, the sleeve member 15 is free to rotate upon the barrel relative to the bushing 24 by nature of the slip-fit between the inwardly turned flange 16 of the sleeve and the reduced circular region of the bushing member disposed between the upper screw-threaded projection 25 and the main body of the bushing. The expansion spring 20 is arranged so as to be resiliently unflexed when the rod member 17 occupies its lowermost position within the barrel, and when the outer sleeve 15 is screwed downwardly to its lowermost position upon the barrel.

Assuming the rod member 17 to occupy a stationary lowermost position within the barrel, rotation of the outer sleeve 15 in one direction to move the same upwardly upon the barrel causes a corresponding movement of the bushing 24 which slides upwardly within the hexagonal chamber 12 of the barrel while at the same time stretching the spring 20 and exerting spring tension upon the rod member to urge the same upwardly within the barrel.

Figure 1:
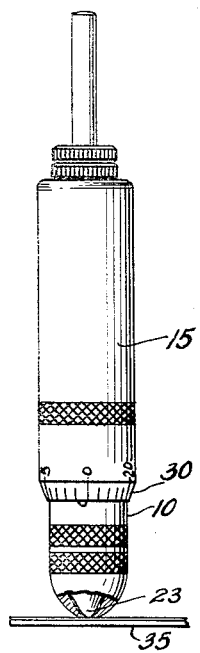
Fig. 1 is an elevational view of the present improved magnetic gage.
Figure 4:
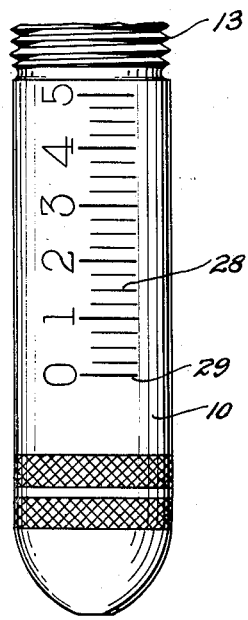
Fig. 4 is an enlarged elevational view of the casing or barrel member of the gage upon which is disposed the stationary portion of a graduated measuring scale.

As shown particularly in Figures 1 and 4 of the drawings, the outer surface of the barrel 10 is provided with a graduated scale 28 having a zero reference point 29 arranged to coincide with the lower edge of the sleeve 15 when the latter occupies its lowermost position upon the barrel 10, and when the expansion spring 20 is in a relaxed or untensioned condition. The lower edge of the sleeve 15 serves as an index point to determine the extent of longitudinal movement of the sleeve relative to the barrel and away from the fixed zero reference point 29. As will be seen from Figure 4, the scale 28 is divided into five equally spaced major graduations, with each of the major graduations being divided into four minor graduations. Each of the minor graduations of the scale corresponds to the linear pitch of the screw-threaded region 13 of the barrel, and upon one revolution of the sleeve 15, the lower edge of the sleeve will move longitudinally on the barrel one minor graduation. Additionally, the sleeve 15 is provided at its lower peripheral edge with a scale 30 having graduations ranging from zero to 25. Thus, each of the minor graduations on the scale 28 may be divided into twenty-five (25) parts to enable the gage operator to very accurately determine the longitudinal displacement of the sleeve on the barrel, independently of a complete rotation of the sleeve with respect to the barrel. It will be understood that the scales herein referred to are common to many types of measuring instrumentalities such as the micrometer caliper wherein the extent of relative travel between two threadedly connected members may be accurately measured.

Figure 6:
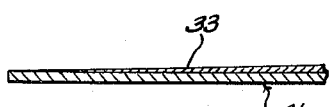
Fig. 6 is a longitudinal vertical sectional view taken along the line 6—6 of Fig. 5.
Figure 5:
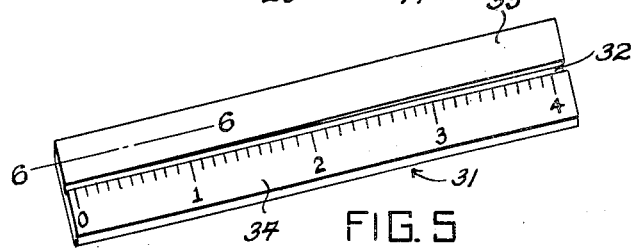
Fig. 5 is a perspective view of a precalibrated reference bar used in conjunction with the present magnetic gage to interpret scale readings thereof in terms of the thickness of a non-magnetic surface being measured.

Figures 5 and 6 of the drawings disclose a pre-calibrated reference bar 31 which is used in conjunction with the magnetic gage to accurately translate the reading of the scales 28 and 30 of the gage in terms of the thickness of a non-magnetic body, layer or sheet disposed upon a magnetic surface. The reference bar comprises an extremely accurate machined rectangular body of magnetizable metal, such as steel, which is divided by a longitudinal channel 32 into two longitudinally coextensive regions or surfaces. One of the longitudinal coextensive surfaces, designated 33, is plated and thereafter taper ground so as to vary the thickness of the plating in accordance with the graduations of a scale carried upon the opposite unplated coextensive surface 34. In practice, the bar 31 is constructed by accurately machining the same to its rectangular shape, with extreme car being taken to insure parallelism between the sides of the bar. Thereafter, the surface 33, which is to bear the plating, is subjected to plating operations whereby a considerable thickness of plating is built up upon the surface and thereafter taper ground from one end to the other of the bar to provide a varying thickness of plating between zero and the maximum thickness of plating desired. At this time, by accurate measurement, the calibrations are applied to the reference surface 34 of the bar by accurately measuring the thickness of the plating disposed upon the tapered surface 33.

In operation, when it is desired to determine the thickness of non-magnetic platings or coatings carried upon steel or other magnetizable metallic bodies, the gage is positioned with the tapered lower end thereof in abutting relation to the workpiece, as indicated at Figure 1 by the numeral 35, with the pointed end 23 of the magnet extending within the small opening of the barrel and terminating flush with the lower end thereof, in order to magnetically engage the outer surface of the coated workpiece. At this time, magnetic attraction between the magnet 22 and the magnetizable base metal of the workpiece will cause the point of the magnet to strongly adhere to the plated or coated outer surface of the workpiece. Thereafter, by rotation of the sleeve 15 upwardly upon the barrel while holding the latter against the workpiece, the spring 20 will be tensioned in a manner to urge the magnet and rod upwardly within the barrel. Rotation of the sleeve is continued to a point at which the rod and magnet spring upwardly within the barrel and out of magnetic engagement with the workpiece. At this point, a reading may be taken from the scales 28 and 30 to determine the extent of movement of the sleeve 15 upon the barrel and the consequent tension placed upon the spring 20 required to overcome the forces holding the magnet in engagement with the workpiece, it being understood that the forces necessary to disengage the magnet from the workpiece vary in inverse proportion to the thickness of the non-magnetic plating or coating disposed upon the magnetic base surface. In effect, the scales 28 and 30 serve only as references to measure the force necessary to pull the magnet away from the body being measured. After a reading has been obtained upon the scales 28 and 30, the gage is then transferred to the reference bar 31 with the sleeve positioned at the same reading at which the magnet previously sprang out of engagement with the coated or plated workpiece. The magnet is then engaged with the plated region 33 of the reference bar at the zero point by depressing the upper end of the rod 17, at which time the gage is moved longitudinally along the plated surface of the reference bar to a point at which the magnet is once again snapped out of engagement with the tapered plated surface of the reference bar. At this point, reference is made to an adjacent point on the scale of the reference bar to accurately read the thickness of the plating or coating disposed upon the surface 35 of the bar and corresponding to the plated or coated surface upon the actual workpiece.

It will be understood that the plated surface of the reference bar 31 is accurately taper ground in order that the plating thereon increases in thickness from one end to the other of the graduated scale, with the zero reading of the scale positioned at the point of termination of the plating upon the surface 33. In this manner, any reading of the scale disposed upon the gage may be interpolated in terms of thickness of the plating disposed on any object simply by transferring the gage to the reference bar and sliding the same longitudinally over the plated surface, starting from the zero reference point and moving to the point where the magnet snaps out of magnetic engagement with the reference surface. At this particular point upon the reference surface 33, the thickness of the plating thereon corresponds exactly with the thickness of the plating or coating disposed upon the object from which the previous scale reading has been taken.

In practice, it has been found that variations in thickness of the base magnetic metal has no appreciable effect upon the operation of the present gage provided that the thickness of the base metal is in excess of .022 inch, and in practice, the base metal thickness of practically all commercial objects is in excess of this latter figure. However, in the event that the thickness of the magnetic base metal is known to be less than .022 inch, compensation for this factor may be had by determining the degree of spring tension required to separate the magnet from magnetic engagement with a reference bar or piece having the same thickness and properties as the base metal surface of an object being measured. Thereafter, the thickness of the plating or coating upon the relatively thin surface may be accurately determined after knowing the thickness of the base metal therebeneath. In this connection, it will also be noted that the present gage may be utilized in determining the actual thickness of relatively thin sheets of magnetic metal, below .022 inch, as the magnetic properties of a sheet diminish in proportion to the thickness thereof when such sheets are less than .022 inch in thickness.

It will further be understood that the materials from which the various parts of the gage are formed are preferably non-magnetic, with the exception of the magnet 22 which, as before stated, is preferably formed from a suitable alloy possessing permanent magnetic qualities.

In view of the foregoing, it will be seen that the present invention provides a simple yet highly efficient gage device for determining the thickness of non-magnetic platings or coatings disposed upon magnetic metallic surfaces, such as steel, iron, or the like. In utilizing the magnetic gage device in conjunction with a reference bar having a plated surface of known and varying thickness, the thickness of platings or coatings upon a given object may be quickly and easily determined in a two-step operation, first by determining upon the reference scale of the gage device the point at which the magnet no longer adheres to the work surface, and thereafter transferring the gage to the reference bar to read the thickness of the plating in terms of thousandths of an inch.

While the present gage device has been described primarily as used in determining the thickness of non-magnetic platings or coatings disposed upon magnetic surfaces, it will be understood that the same may be employed in many capacities wherein it is desired to determine or measure the magnetic properties of various bodies. For example, it has been found that the present gage device is extremely useful in indicating various grades or types of machining or cutting instrumentalities which separately possess different magnetic characteristics. Simply by comparing the forces required to separate the magnet from a given body with that required to separate the magnet from a second body, various articles or objects may be distinguished from one another by the difference in their magnetic characteristics.

Gages formed in accordance with the present invention are further characterized by their ease of operation and their ability to be used in connection with relatively large workpieces which would normally preclude the application of a micrometer caliper or similar instrument thereto. In view of the relatively few and simple parts which comprise the present gage, the same is further characterized by its economy of manufacture.

While a single preferred embodiment of the invention has been disclosed in detail, it will be manifest that various modifications with regard to constructional details may obtain without departing from the spirit of the invention or the scope of the following claims.

I claim:

1. A magnetic gage device comprising a tubular casing of non-magnetic material formed with an opened-ended chamber and an external screw-threaded region; a permanent magnet carried in the chamber of said casing and movable to an exposed position at one end of said casing for magnetic engagement with a body to be gaged; a tubular sleeve rotatively carried on said casing and having an internal screw-threaded region in threaded engagement with the screw-threaded region of said casing, said sleeve being movable longitudinally on said casing upon relative rotation of said sleeve and casing; a graduated scale disposed on said casing for indicating the extent of longitudinal movement of said sleeve relative to a fixed point on said casing; and means including a resiliently expansive spring connected between said sleeve and said magnet for urging the latter to move inwardly of the chamber of said casing and out of magnetic engagement with a body being gaged upon longitudinal movement of said sleeve in one direction relative to said casing.

2. In a device for measuring the magnetic properties of a body, a hollow open-ended casing of non-magnetic material formed upon its outer surface with a screw-threaded region; a permanent magnet positioned within said casing and movable therein to a position of exposure at one end of said casing for magnetic engagement with the surface of a body to be measured; a tubular sleeve rotatively carried on said casing and having an internal screw-threaded region in threaded engagement with the screw-threaded region of said casing, said sleeve being movable longitudinally on said casing upon relative rotation of said sleeve and said casing; a graduated scale extending longitudinally of said casing for indicating the extent of movement of said sleeve toward or away from a fixed point on said casing; and spring means carried in said casing and connected between said sleeve and said magnet for urging said magnet to move inwardly of said one end of said casing in response to the longitudinal movement of said sleeve in a direction away from the said one end of said casing.

3. In a gage device for measuring the magnetic properties of a body, a cylindrical non-magnetic casing formed with an internal chamber opening at either end of said casing and an external screw-threaded region; a permanent magnet slidably carried in one end of the chamber of said casing and movable to a flush position with respect to one end of said casing for engagement with a body to be measured; a non-magnetic rod member rigidly carried by said magnet and extending longitudinally through the opposite end of said casing; a bushing slidably carried on said rod in spaced relation to said magnet; a spring connected between said rod member and said bushing; a tubular sleeve connected with said bushing and rotatively carried upon said casing and provided with a screw-threaded region in threaded engagement with the screw-threaded region of said casing, said sleeve being movable longitudinally on said casing upon relative rotation of said sleeve and casing, said bushing being movable longitudinally within said casing upon rotation of said sleeve; and a graduated scale disposed longitudinally on said casing and including a fixed reference point, said scale serving to indicate the extent of longitudinal movement of said sleeve away from the fixed reference point on said casing, said spring, upon movement of said sleeve in a direction away from the reference point on said scale, serving to urge said magnet inwardly of the said one end of said casing and to pull said magnet out of engagement with a body to be measured.

4. In a magnetic gage device; an elongated hollow barrel terminating at one end in a relatively small opening; a tubular sleeve rotatively carried on said barrel and movable longitudinally thereof upon rotation; a non-magnetic rod member carried axially in said barrel for longitudinal sliding movement therein and having one end projecting outwardly from the end of said barrel opposite said opening; a permanent magnet carried at the opposite end of said rod member within said barrel and movable with said rod member to a position projecting through the small opening formed in said barrel for magnetic engagement with a body to be gaged; a bushing member slidably carried within said barrel and formed with a bore for the sliding reception of said rod member; means connecting said bushing member with said sleeve and providing for sliding movement of said bushing member within said barrel upon relative rotation of said sleeve and said barrel; spring means carried within said barrel and connected between said bushing and said rod member for urging said magnet to move inwardly of the opening of said barrel upon rotation of said sleeve in one direction on said barrel; and a graduated scale disposed on the outer surface of said barrel for indicating the extent of longitudinal movement of said sleeve with respect to a fixed point on said barrel.

5. Apparatus for determining the thickness of a non-magnetic coating disposed upon a magnetic body comprising a casing formed with a screw-threaded region; a sleeve member threadedly carried on said casing for movement longitudinally thereof upon relative rotation of said casing and said sleeve member; a rod disposed longitudinally within said casing and extending outwardly from one end thereof; a permanent magnet carried by said rod within the opposite end of said casing and movable to a position of exposure at the said opposite end of said casing for magnetic engagement with the coated surface of a body to be gaged; means including a spring carried within said casing and connected between said rod and said sleeve member for urging said magnet to move inwardly away from the said opposite end of said casing and out of magnetic engagement with a body being gaged upon rotation of said sleeve member in one direction upon said casing, said last-named means being effective, upon continued rotation of said sleeve member in said one direction, to overcome the forces of magnetic attraction between said magnet and a body being gaged and to move said magnet inwardly of said casing; and a reference bar of magnetic material having known, but varying, thicknesses of a non-magnetic coating disposed thereon and having a graduated scale for indicating the thicknesses of coating thereon and providing a surface with which said magnet may be engaged to determine the thickness of the non-magnetic coating at the point at which said last-named means is effective to disengage said magnet.

6. Apparatus for determining the thickness of a coating disposed upon a magnetic base, and wherein said coating possesses different magnetic properties from that of said base, comprising a casing; a permanent magnet slidably carried in said casing and movable therein to a position of exposure for magnetic engagement with a body to be measured; means in said casing connected with said magnet and movable to a position to overcome the forces of magnetic attraction between said magnet and the body to be measured; means for measuring the movement of said last-named means; and a comparator gage of magnetic material having thereon known, but varying, thicknesses of a coating possessing the same magnetic properties as the coating to be measured and having a graduated scale for indicating the thicknesses of coating on said gage, the coating of said gage providing a uniformly tapering surface with which said magnet may be engaged to determine the thickness of the coating of the body to be measured by comparison with the thickness of the coating on said gage at the position at which said last-named means is effective to overcome the magnetic attraction between said magnet and the body to be measured.

7. In combination with a magnetic gage device for determining the magnetic properties of a coated magnetic body including a magnet for magnetic engagement with a body to be gaged, means for overcoming the magnetic forces between the magnet and a body to be gaged, and means for measuring the force necessary to disengage the magnet from a body to be gaged; a comparator gage for determining the thickness of the coating of the body being gaged comprising a magnetic base of uniform thickness having on one side thereof varying, but known, thicknesses of a material having the same magnetic properties as the coating of the body to be gaged, said material being arranged to provide a continuous tapered surface layer on said base to which the magnet of said gage device may be applied and thereafter disengaged to determine by comparison the thickness of the coating disposed upon the body being gaged.

8. A comparator gage for magnetic measuring instruments comprising a body of magnetic material having a uniform thickness, a continuous layer of material of different magnetic characteristics from that of said body carried on one side of said body, said layer having a progressively varying thickness throughout its length, and a graduated scale on said body adjacent said layer for indicating the thickness of said layer at any given point along its length.

GLEN N. KROUSE.

REFERENCES CITED

The following references are of record in the file of this patent:

UNITED STATES PATENTS

| Number | Name | Date |
|---|---|---|
| 2,507,529 | Lipson | May 16, 1950 |

OTHER REFERENCES

Journal of Scientific Instruments and Physics in Industry, June 1949, pages 209–216, Article by Bennett.

American Machinist, June 12, 1940, pages 426–427, Article by Gibbons.